United States Patent [19]
Lauriello et al.

[11] Patent Number: 4,630,886
[45] Date of Patent: Dec. 23, 1986

[54] LIGHTGUIDE DISTRIBUTING UNIT

[75] Inventors: Philip J. J. Lauriello, Basking Ridge; Lawrence M. Slavin, Rockaway, both of N.J.

[73] Assignee: AT&T Bell Laboratories, Murray Hill, N.J.

[21] Appl. No.: 600,891

[22] Filed: Apr. 16, 1984

[51] Int. Cl.$^4$ .............................................. G02B 6/36
[52] U.S. Cl. .................................................. 350/96.20
[58] Field of Search ............... 350/96.15, 96.16, 96.20, 350/96.21, 96.22; 179/98; 455/612

[56] References Cited

U.S. PATENT DOCUMENTS

| | | | |
|---|---|---|---|
| 4,002,856 | 1/1977 | Sedlacek et al. | 179/98 |
| 4,160,880 | 7/1979 | Brey | 179/98 |
| 4,217,030 | 8/1980 | Howarth | 350/96.21 |
| 4,320,261 | 3/1982 | Scerbo et al. | 179/98 |
| 4,371,757 | 2/1983 | Debortoli et al. | 179/98 |
| 4,408,353 | 10/1983 | Bowen et al. | 455/608 |
| 4,502,754 | 3/1985 | Kawa | 350/96.20 |

FOREIGN PATENT DOCUMENTS

| | | | |
|---|---|---|---|
| 3116869 | 11/1982 | Fed. Rep. of Germany . | |
| 3217320 | 2/1984 | Fed. Rep. of Germany | 350/96.20 |
| 2515466 | 4/1983 | France . | |
| 2531544 | 2/1984 | France | 350/96.21 |
| 58-162918 | 9/1983 | Japan | 350/96.20 |

OTHER PUBLICATIONS

"Preview of OFC '84 Single-Frequency Lasers and High-Speed System Developments Highlight the New Orleans Meeting", *Lasers & Applications*, J. Hecht, Jan. 1984, pp. 69 et seq. (see pp. 78 and 81).

"Bell System Lightguide Cable Interconnection Equipment, Central Office to Customer Premises", *Proceedings of 32nd International Wire and Cable Symposium*, M. R. Gotthardt, Nov. 15-17, 1983, pp. 45-48.

Primary Examiner—John Lee
Attorney, Agent, or Firm—Charles Scott Phelan

[57] ABSTRACT

A multishelf main distributing frame for lightguide fibers is provided in which each shelf includes a pair of spaced plates (67,68) for receiving cable fibers from the rear portion of the shelf, receiving cross-connect jumper fibers from the front portion thereof, and having one or more removable connector panels (30) for terminating lightguide fibers at opposite sides thereof. The panels are recessed from the front edges of the shelf to assure room for a predetermined minimum bending radius for jumper fibers connected to the front of the panels. Once such panels are installed, they cooperate with the shelf plate members and with a windowed cable channel (17) at the rear of the shelf for protecting relatively lightly sheathed individual fibers of cables passed through the channel into the shelf region. A hinged closure (24) is provided at the front of each shelf for protecting cross-connect jumper fibers of that shelf without subjecting those fibers to possible mechanical damage when the closure is closed.

10 Claims, 3 Drawing Figures

LIGHTGUIDE DISTRIBUTING UNIT

FIELD OF THE INVENTION

This invention relates to a telecommunication path distributing unit and more particularly to such a unit for lightguide fibers.

BACKGROUND OF THE INVENTION

Communication path distributing units have long been known in the electric wire technology and are often called main distributing frames. In such equipment, it is also known to employ separate adjacent frame sections for terminating cable wires in large numbers on terminal blocks on different horizontal shelves of each unit. The separate sections are employed for cables extending to different types of transmission regions. For example, in a telephone central office, one section might be used for cables extending to the outside plant whereas another section, adjacent to the first, would be used for cables and wires extending to central office equipment. In a similar vein, adjacent frame sections can be employed for terminating wires of external transmission cables in one frame, and wires extending to building equipment or other subscriber locations on another unit.

On the shelves in a section of a distributing frame, the wires usually enter from exposed side or back regions of the shelf after having been passed vertically across the sides or backs of shelves to reach the proper shelf location. Cross-connect jumper wires are then applied to the fronts of the terminal blocks to interconnect the high density terminations. Such jumpers extend from connections on the front of a block, across the front of the block at the upper or lower edge thereof to an intermediate channel between adjacent sections, and to other shelves. The jumpers may also pass to the bottom of the section where they are extended through a jumper wire trough laterally to adjacent frame sections which are similar to that just described. Two examples of wire type distribution frames are to be found in the U.S. Pat. No. 4,002,856 to W. S. Sedlacek et al., and the U.S. Pat. No. 4,320,261 to L. J. Scerbo et al. In another U.S. Pat. No. 4,371,757 to G. DeBortoli et al., the distribution frame is made in the form of a vertical channel through which individual wires are passed to the levels of appropriate apertures or windows, in one wall of the channel. Then the wires are extended through one of the those windows to a terminal block which is removably mounted adjacent to that one window.

In the lightguide fiber technology, there are similar needs for distributing and cross-connecting communication paths and for realizing high density path terminations. However, some frame concepts for the wire technology are not well suited to the fiber technology because the lightguide fibers are relatively fragile in some senses, and they are not conveniently dressed into, or around, small-radius bends. In addition, because the connectorization, i.e., securing fiber to a plug, success rates for lightguide fibers may be less than perfect, it is sometimes necessary to discard fiber ends and associated connector plugs, and attempt a new connection. Fiber slack must be available for use in such events.

Various efforts have been made to achieve high density path terminations and connections in the lightguide technology. A U.S. Pat. No. 4,408,353 to T. P. Bowen et al. shows a communication system employing a so-called splitter, or box, for lightguide fibers in which a cable is brought into a port on one side of the box and the individual fibers thereof are then separately fanned out to different cable connectors at other points in the box. External fiber connections are made at those individual fiber connectors.

A paper by J. Hecht, entitled "Preview of OFC '84 - Single-Frequency Lasers and High-Speed System Developments Highlight the New Orleans Meeting", and appearing at pages 69-85 of *Lasers & Applications,* January 1984, shows at pages 78 and 81 a splice loop unit for use in a lightguide wiring center for local area networks. The unit includes an array of pairs of fiber-coil-receiving pockets. Two fibers which are to be connected together are extended along opposite sides of the splice loop unit to a free pair of pockets, and then each fiber is extended upwardly so the two fibers can be connected above the unit. The slack in each fiber is dropped into a different pocket of the pair, and the connector is placed in a slot between the two pockets of the pair.

A different approach to the lightguide fiber distribution and interconnecting problem is shown in a paper by M. R. Gotthardt entitled "Bell System Lightguide Cable Interconnection Equipment, Central Office to Customer Premises" and appearing at pages 45-48 of Proceedings of 32nd International Wire and Cable Symposium at Cherry Hill, N.J., Nov. 15-17, 1983. Single-frame installation arrangements are shown. In one of these arrangements, for example, a lightguide fanout unit is equipped with a front panel having fiber connectors mounted thereon and each extending from the outside to the inside of the fanout unit. That unit is also equipped with a ribbon of fibers which extends from respective inner ends of the connectors through an aperture in a wall of the unit to a fiber array connector on the outside of the unit. Multifiber ribbon-based external lightguide cables coming to a frame, or equipment box, employing the fanout unit are brought into the box and their ribbons are interconnected to the fanout unit by means of a fiber array connector in the overall equipment frame. Relatively permanently installed outside plant cable fibers and relatively changeably installed interconnect jumpers share space to the extent that when a jumper connection is changed at least one associated outside plant cable fiber is likely to be disturbed. This poses risks to cable fiber mechanical integrity as will be subsequently discussed.

SUMMARY OF THE INVENTION

The foregoing problems are alleviated in accordance with the present invention in which a lightguide distributing unit, or distributing frame, includes multiple shelves, each having a protected region for receiving fibers of incoming cables. That protected region allows the storage of coils of slack for fibers which otherwise extend to panel mounted connectors. The panels for those connectors are recessed from the front of the shelf in order to assure at least a predetermined minimum bending radius for cross-connect jumper fibers when the shelf front is covered, i.e., as by a door.

BRIEF DESCRIPTION OF THE DRAWING

A more complete understanding of the invention and the various features, objects, and advantages thereof may be obtained from a consideration of the following detailed description in connection with the appended claims and the attached drawings in which

DETAILED DESCRIPTION

Figure 1:
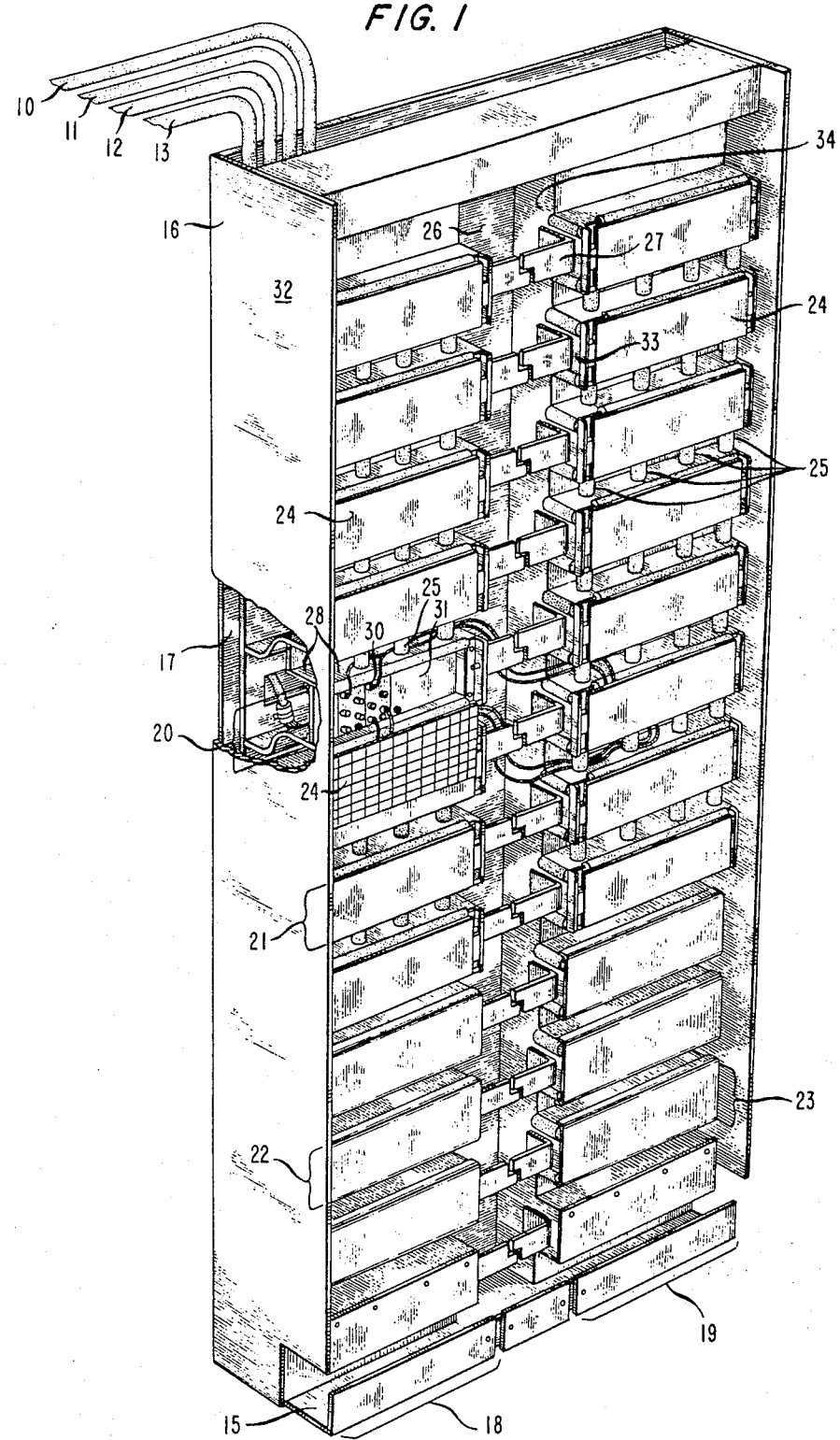
FIG. 1 is a front left perspective of a frame in accordance with the present invention.

FIG. 1 illustrates a main distributing frame, or unit, 16 for light guide fibers and shows the arrangement of its shelves. Fiber cables 10 through 13 enter, illustratively, at the top of frame 16 and extend vertically through a windowed, but otherwise enclosed, channel member 17 (which will be described) to an appropriate one of the plural shelves of the frame. of course, cables can enter from either the top or the bottom, as is well known in the art. At a shelf on which the fibers of a cable are to be terminated, the cable exits through a window of the channel into a protected region (to be described) where the frame and shelf structure shield cable fibers from events which might inflict physical damage or from accidental alteration of cable fiber connections. The protective sheathing is removed from the cable portion outside the channel window for a suitable distance to allow individual fiber connection to individual connectors on the shelf. The vertical channel 17 makes it relatively easy to add and remove cables with low likelihood of a cable end entering prematurely into a fiber protected region at an incorrect shelf. The channel also provides a backplate type of protection to prevent rear access to the protected regions of the respective shelves except by way of the appropriate window on the channel 17.

Frame unit 16 is comprisedof two columns of fiber interconnection shelves forming respective frame sections 18 and 19. Certain of the shelves are provided with hinged doors 24, such as at the shelves 20 and 21, for providing protective covering on the front portion of the shelf. Such doors cover connectors utilized for fiber cross-connect jumpers. Others of the shelves, e.g., 22 and 23, are unequipped and constitute reserve capacity; so there are illustratively provided with snap-on covers which are compatible with the overall appearance of the equipment. Use of unequipped, or reserve, shelves avoids the cost of fully equipping all shelves with, e.g., doors and connectors and mounting brackets until needed for additional cables.

Between the frame sections 18 and 19 there is a cross-connect vertical jumper channel 26 for accommodating cross-connect jumpers extending between different shelves of the frame. Across the front of the channel 26 at each shelf location there is provided a split retaining bar such as the bar 27 at the top shelf location. A zig-zag split is included in the central portion of each such bar to facilitate the radial insertion of cross-connect jumper fibers into the jumper channel region easily without the necessity for threading the fiber through all of the channel. It is relatively unlikely that any such fiber, once inserted, will accidently be projected back out through that same split again because the jumper fibers tend to follow relatively natural straight paths or smoothly flowing curved paths which are of substantially larger radius than those represented by the zig-zag splits in the retaining bars 27.

Individual shelves (which will be subsequently described in greater detail) comprise a box type of enclosure for the aforementioned protection region, and the boxes or shelves are spaced to form horizontal channels, such as channel 28 above shelf 20, for cross-connect jumpers between vertically adjacent shelves. Thus, it can be seen at the shelf 20 (in FIG. 2), at which the door is open, that the cross-connect jumpers, such as one of the jumpers 53, extend out from between upper and lower plate members of the shelf and over a rounded front edge 56 of the shelf upper plate member to pass behind a set of split retaining pins 25 to the aforementioned vertical jumper channel 26. The splits in pins 25 are oriented to provide relatively unnatural zig-zag paths for fibers inserted therethrough into the horizontal jumper channel 28 so that a jumper, which assumes a relatively natural and smoothly flowing straight configuration in the channel, is unlikely accidentally to be projected outward through those splits.

Cross-connect jumpers extending between frame sections 18 and 19 are advantageously provided with sufficient slack so that a portion of each jumper must loop downward through the channel 26 and then return back up again to its destination horizontal jumper channel. This looping assures relatively tension-free jumper paths in which all bends are of at least the predetermined minimum bending radius to prevent long-term fiber damage and significant signal attenuation in the jumper. A relatively loose arrangement of jumpers as described for the channels, both horizontal and vertical, makes it comparatively easy to insert and remove jumpers to prevent undue jumper accumulation and to prevent damage to other jumpers when one of them is being removed.

Although FIG. 1 shows only two frame sections 18 and 19, it is to be understood that additional sections can be added as necessary to increase the fiber termination capacity. For that case, cross-connect jumpers are routed down vertical channel 26, through horizontal trough 15 to the destination frame section, and up its channel 26 to the destination shelf. Of course, a horizontal trough could also be provided across the tops of the frame sections for routing jumpers between sections.

The door 24 on the shelf 20 is hinged in front of the front edge of a bottom plate of the shelf so that when the door is open the entire front space between upper and lower plates of the shelf is open and available for access to permit initial cable and cross-connect jumper installation and subsequent fiber cross-connect rearrangement. The usual cable termination identification is secured to the inside of the door so that it is in a conveniently readable orientation when the door is open for craft personnel making fiber cross-connections at the shelf.

Figure 2:
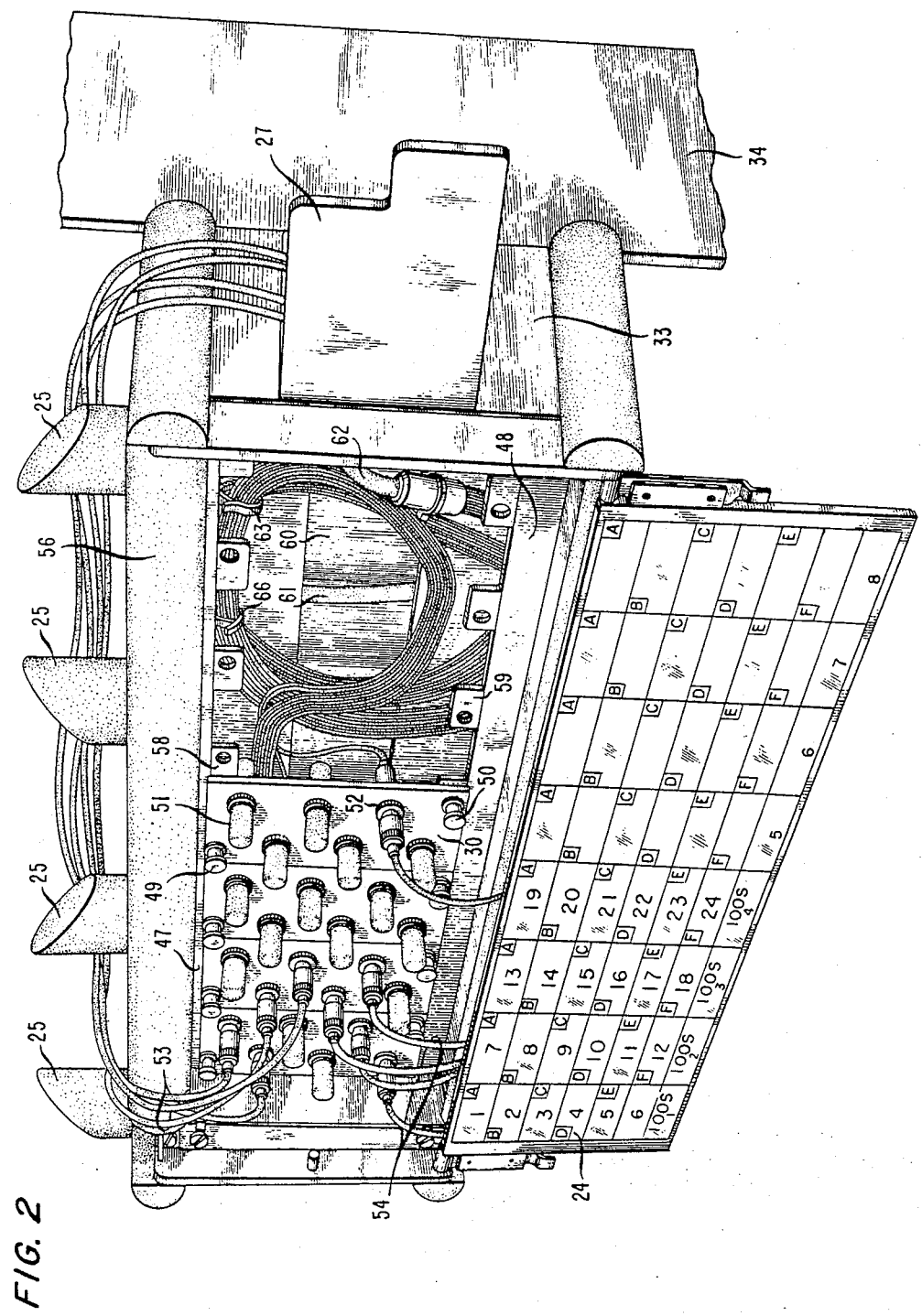
FIG. 2 is an enlarged scale front view of a single-shelf portion of the frame of FIG. 1.

Also at shelf 20, and in FIG. 2, there can be seen several connector panels, such as a panel 30, each having mounted thereon six connector sleeves 52. Sleeves 52 are each advantageously part of a connector system, for example, of the type shown in the J. M. Anderson (Case 1) patent application Ser. No. 472,849, (now U.S. Pat. No. 4,541,685) filed Mar. 7, 1983, entitled "Optical Connector Sleeve," and assigned to the same assignee as the present application. The Anderson connector is a socalled flexible ferrule connector including the illustrated sleeve and a pair of plugs. Plugs of a pair are secured on the bare ends of a pair of fibers and then inserted, in a twist-lock manner, for example, onto opposite ends of the sleeve to establish optical signal path coupling between the fibers. Other types of lightguide sleeves and plugs (e.g., so-called biconic connectors), including various interlocking methods, can also be readily employed by using an appropriately modified connector panel.

Panel mounted connectors permit a jumper fiber to be connected at the front of the panel without disturbing either the panels or the cable fibers plugged into connector sleeves on the rear of the panels. A blank, or filler, panel 31 is secured in place to the right of the panel 30 to close off the remaining front portion of the shelf. This arrangement completely closes the front portion of the shelf between its upper and lower plate members. Each shelf is further enclosed at the sides thereof. Thus, a frame end plate, such as the plate 32 on the left side of section 18 in FIG. 1, closes the left sides of all shelves of that section. The interior side (adjacent to channel 26) of each shelf is enclosed by a forward side plate 33 of the shelf and a rearward side plate 34 extending the full height of the frame section. Plates 33 and 34 are seen in FIG. 1 at the left sides of shelves of frame section 19 and in FIG. 2 on the right-hand side of the shelf 20 there illustrated.

Since the shelf is located between an end guard plate 32 of a frame section and side plates 33 of the shelf and 34 of the frame sections 18 and 19, it will be appreciated that behind the connector panels 30 and filler panel 31 is a protected region. That region is further defined by the windowed channel members such as 17 at the back of the region. Thus, the individual cable fibers which are located and connected in that protected region are indeed protected from accidental access and from other events that might injure the individual cable fibers. Those cable fibers are relatively lightly individually protected; but, on the other hand, they involve relatively infrequent need for changing their connections. By contrast, at the front of the panels 30 and 31, which is protected only by the door 24, which can be opened relatively easily, the cross-connect jumper fibers are connected. These jumper fibers are relatively heavily individually sheathed because it is in the nature of their function to be changed from one connection arrangement to another relatively frequently; so they are less likely to be damaged by being more readily accessible and exposed.

It will be subsequently shown that on infrequent occasions of initial installation or subsequent alteration of the cable fiber connections in the protected regions, it is simply necessary to remove one or more of the panels 30,31 and pull them forward to permit access to the connector portions on the back sides of those panels, as well as permitting manual access to the protected region for pulling through new cable fibers.

A cut-away portion of the frame 16 in FIG. 1 shows a part of the frame section 18 end guard 32 removed to show the interior relationship among channel 17, channel 28, and the protected region in back of a connector panel such as the panel 30.

Figure 3:
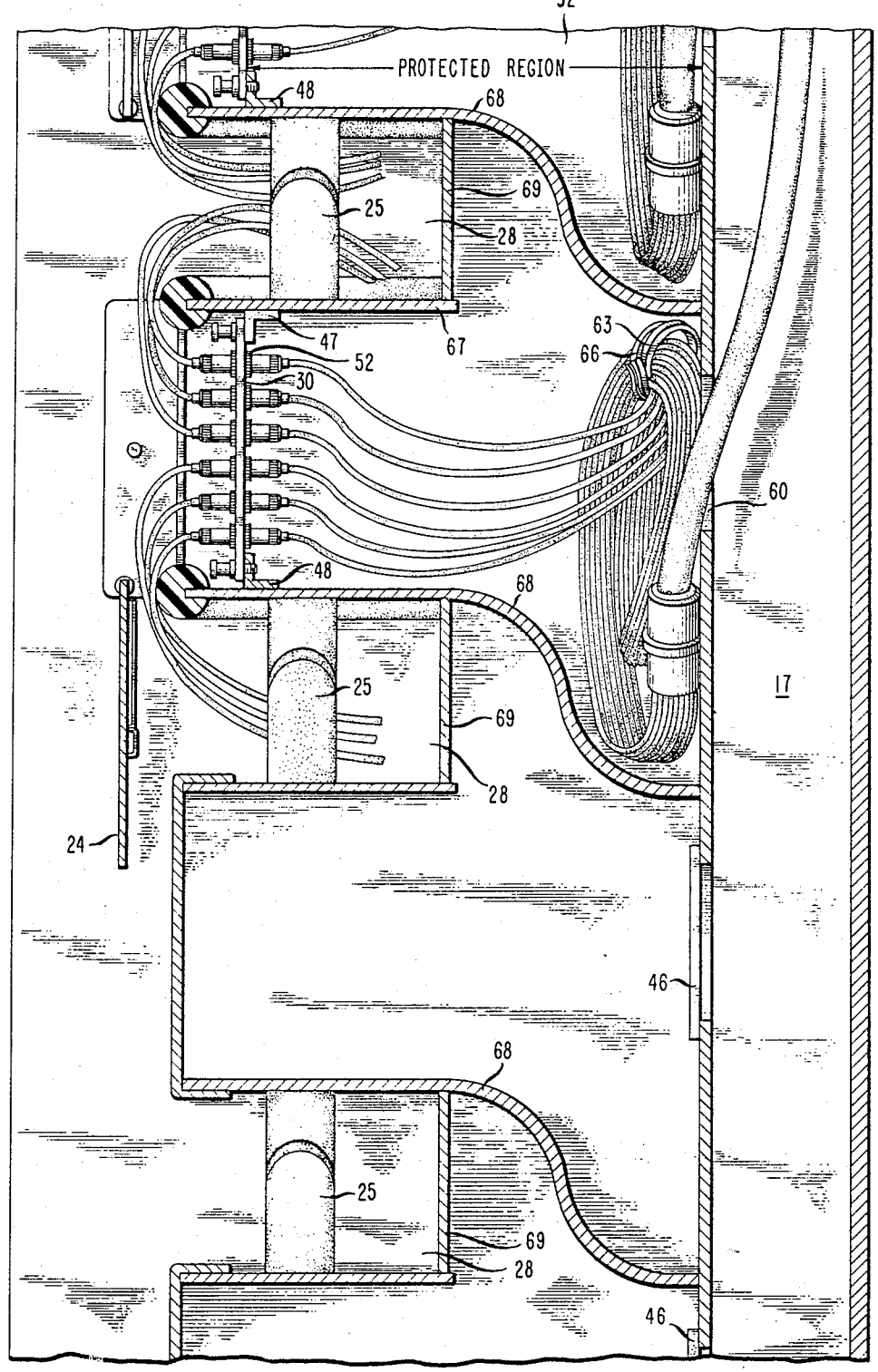
FIG. 3 illustrates a side view in cross-section to show the interior of a protected region in a distributing frame shelf.

It is useful here to note that the windowed cable channel 17 at the back of the frame section 18 is advantageously comprised of two separate channel portions to complete the span of the full width of the frame section 18. Subdivision of the cable channel function can be accomplished to a greater degree to provide as many subdivisions as are practical until one reaches the extreme of having a single conduit for each cable extending vertically along the back of the frame section from the top of the frame to any particular shelf at which the cable is to be terminated. In the case of a single channel across a full frame section width or two or more channel subdivisions, the windows for exits to respective shelves can be advantageously omitted at selected levels of the frame, on some channel subdivisions, where shelf access is not required. Alternatively, a removable captive (e.g., magnetic) plate such as the plate 46 in FIG. 3 is provided at each window for covering all of that window except the part which is needed for actual cable entry. The plate is provided to reduce the likelihood of a cable end accidentally entering the wrong shelf window and thereby gaining access to a protected region of a shelf where the cable end may possibly damage unsheathed fibers fanning out to connector panels on that shelf.

In FIG. 2 the shelf 20, with the door 24 thereof opened, is shown in a close-up view to illustrate various features of the shelf arrangement illustratively employed at all equipped shelves. This view should be considered in conjunction with the FIG. 3 view which is a cross-section looking in from the right-hand side of FIG. 2 with the side plates 33 of the shelf, and 34 of the frame section 18 removed from convenience of illustrating the interior of the shelf and surrounding regions. Those surrounding regions include the protected region between the connector panels such as 30 and the windowed channel 17. The filler panel 31 has been removed in the FIG. 2 illustration in order to provide a more frontal view into that same protected region.

In FIG. 2, the split retaining pins 25 can be seen more clearly along with four cross-connect jumper fibers 53. Those fibers extend outward toward the front of the frame from two of the connector panels 30, up around the rounded front edge 56 of the upper plate of the shelf, behind retaining pins 25 in the horizontal jumper channel 28 and into the vertical jumper channel 26 to extend downwardly through the latter channel. Four other cross-connect jumper cables 54 are also shown in this view extending from connectors on the same two panels, over the front edge of the lower plate of the shelf and downward therefrom behind the hinged edge of the opened door 24.

Two panel receiving brackets 47 and 48 are secured to the upper and lower plates of the shelf. These brackets are so secured at a location recessed from the front edges of the respective plates to allow clearance for the connector sleeves 51 and 52, the fiber plugs and the fibers extending from those plugs. Those fibers pass outwardly and then up or down over the shelf plate edges with at least the predetermined minimum bending radius when the door 24 is closed. Brackets 47 and 48 are, however, also close enough to those front edges to assure easy access for manual insertion of jumper fiber plugs into front ends of connector sleeves.

At least two latchable expansion pins, such as the pins 49 and 50, are of a type known in the art and are permanently secured in holes in each panel. Such pins allow no-tool, manual insertion into and removal from aligned holes in the brackets 47 and 48. Therefore, the panels can be easily removed or secured as may be necessary. All the connector sleeves not shown with fibers plugged therein have blank covers on the ends of the sleeves to keep the interior portions thereof clean until the connector sleeve is needed for accomplishing a new fiber connection. Plugs will have been assembled onto ends of at least the cross-connect jumper fibers and checked or tested before a connection is to be made so that thereafter any one of the plugs can be used on any one of the hconnector sleeves.

In the shelf region where the filler panel 31 of FIG. 1 was removed to show the interior portion of the shelf region in FIG. 2, there can be seen several tabs, such as 58 and 59, on the panel receiving brackets 47 and 48, respectively. These tabs include the aforementioned holes which receive the latching pins such as the pins 49 and 50. In this interior of the protected region of the shelf, a window 60 on the cable channel is shown. A cable 61 is seen through the window and extends past the window. Another cable 62 is shown at the right hand portion of the window 60 and passes through that window where it is tied to anchor it on the face of the channel 17 adjacent to the window. The cable sheathing is removed from the cable portion below the tie point; and the fibers of the cable, each with its own relatively light protective sheathing, are coiled in loops of at least the predetermined minimum bending radius. Those loops are suspended in flexible, split, retaining rings 63 and 66 which are secured to the face of the channel 17 above the window 60. The individual fibers then extend from those suspended loops to respective ones of the connector sleeves on the rear side of the connector panels, such as the panel 30.

When a cable is to be installed in the frame 16, the plate 46 is removed; the cable is passed through the windowed channel 17; and the end thereof is brought out through the window 60, at the appropriate shelf for installation and connection to fiber connectors. In order to achieve the actual connection of the fibers to the connectors, the connector panel which is to be used, if previously mounted, is removed by releasing the latching pins 49 and 50 thereof. Individual fibers from the new cable are pulled forward, connector plugs are attached, and the plugs are plugged onto appropriate connector sleeves on the back side of the removed panel. When all of the fibers which are to be so connected have been plugged onto their proper sleeves, the connector panel is moved back into the region between the upper and lower plates of the shelf and secured to the panel receiving brackets by latching the pins 49 and 50 thereof.

During the foregoing installation process, the natural resilience of the fibers allows them to be pulled forward while slack comes out of the coils by slipping in the retaining rings 63 and 66 to assume a smaller loop radius until the connections have been completed. When the panel is restored to its position on brackets 47 and 48, the natural resilience of the fibers causes them to assume once again the illustrated larger loop radius so that an orderly arrangement of fibers in the protected region behind the panels is achieved.

Turning now to the side view in FIG. 3 of the shelf 20 and its surrounding regions, the upper plate 67 and the lower plate 68 of the shelf are more clearly visible. It can there be seen that the lower plate 68 is advantageously extended to be substantially longer then the upper plate 67 in the front to back direction. The main purpose of this plate 68 extension is to provide a barrier between vertically adjacent shelves in the rear protected region, so that tools or other items cannot fall down and damage previously installed fibers in shelves below the particular shelf on which cables are currently being installed. Plate 68 is shaped into what might be called lazy, reverse S configuration so that the rear (right hand in FIG. 3) portion of this plate, extends downwardly behind the horizontal, cross-connect jumper channel 28, which is immediately adjacent to the lower shelf plate 68. This configuration allows the vertical height portion of the protected region behind the connector panels and behind the horizontal cross-connect jumper channels to be employed usefully for accommodating fiber loops suspended from the retaining rings such as 63. In addition, the depressed part of shelf 68 is a convenient place to rest plate 46 while a cable is being installed. Once the new cable is in place, the plate 46 is slipped behind fiber coils to cover a portion of window 60 again. (For clarity, plate 46 was not shown in FIG. 2.)

The paths for fibers between a panel 30 and the channel window 60 is more clearly shown in FIG. 3. At the end of the cable 62 sheathing remaining after fibers have been uncovered and fanned out, the cable is mechanically tied or clamped in a suitable manner. The individual fibers from the cable have only lightweight (compared to the cable) individual protective sheathing in order to keep cable size and cost as low as possible. Before being fanned out, those fibers are normally protected by the overall sheathing of the cable; and a strength member in the cable absorbs tension forces experienced during pulling operations, e.g., when being installed in a duct or channel. Fibers are terminated at the connector panel 30 with enough slack to be coiled in the protected region of the shelf. That slack allows easy installation of the respective fibers in their connectors. Slack fiber coils in that protected region are illustratively of about a three-inch diameter so that the coiled fiber is relatively unstressed as compared, e.g., to frames for wires wherein signal conductors are tightly bundled and often dressed around sharp bends. The low stress is important to fibers because they are believed to be more subject to cracking with age when held in a highly stressed condition as in a sharp bend. Also, signal losses can become significant at bends of less than a predetermined minimum radius for the type of fiber involved. It is useful to have fiber slack available in the event the connections must be changed, as well as to provide extra fiber material if a faulty mating of fiber to connector plug is discovered and must be remade.

The extent of the protected region of a shelf can be more clearly perceived in FIG. 3 where a rear wall 69 of each of the horizontal cross-connect jumper channels 28 prevents jumpers from intruding into the protected region behind the connector panels 30. Similarly, the panels themselves complete the protection of that region on the left hand side as illustrated in FIG. 3. The windowed cable channel 17 provides the protection for the region on the right hand side, as illustrated in FIG. 3. Shelf plate members 67 and 68 define the protected region upper and lower bounds in the left hand portion of the region, and shelf lower plate members 68 of shelf 20 and 68 of the next higher adjacent shelf provide the upper and lower bounds of the protected region in the right hand portion thereof, as shown in FIG. 3. The left hand side end guard plate 32 of the frame section 18, i.e., left hand as illustrated in FIG. 1, provides the protection region boundary definition on one side of the corresponding opposite right hand side members 33 and 34, which were removed to provide the illustrated access in view of FIG. 3, provide similar definition for the other side of the protected region.

Thus, the relatively lightly sheathed individual fibers from the cable 62 and other like cables are well-protected from accidental mechanical damage resulting from any activities going on in regions around the illustrated shelf region. However, signal path coupling access to those fibers is provided in a convenient fashion by the connectors on the connector panels 30 in order to accomplish the cross-connect function of the frame without disturbing the cable fibers in the protected region. Similarly, physical access is provided for installing or removing such a cable and its fibers by the aforementioned removal of the connector panels from their latching engagement with the panel receiving brackets 47 and 48.

Although the present invention has been described in connection with a particular embodiment thereof, it is to be understood that additional embodiments, modifications, and applications thereof, which will be apparent to those skilled in the art, are included within the spirit and scope of the invention.

What is claimed is:

1. A lightguide fiber distributing unit for providing cross-connection facility for relatively fragile lightguide fibers, separated out of at least one otherwise sheathed multifiber cable, by means of relatively robust cross-connection jumper fibers, said unit comprising at least one shelf portion including spaced upper and lower horizontal plate members in essentially parallel planes with one face of each plate member facing one face of the other, said plate member each having front and rear edges, means for covering a space between said rear edges of said plate members except for an opening through which said fibers of said cable can be pulled into a region between said plate members, means for mounting at least one fiber connector means to provide optical coupling via said connector means through said mounting means and between fibers extended to opposite sides of said mounting means, means for removably securing said mounting means between said front and rear edges of said plate members with a first of said opposite sides facing through said region toward said rear edges and a second of said opposite sides facing toward said front edges so that at least a part of said mounting means can be temporarily removed to permit access from said front edges for pulling fibers of said cable into said region and connecting such fibers to said connector means on said first side of said mounting means while allowing cross-connect jumper installation on, and removal from, said second side of said mounting means when said mounting means is secured by said securing means, said removably securing means being spaced back from said front edges of he respective plate members by a distance which is sufficient to assure at least a predetermined minimum fiber bending radius for a jumper fiber extending from a connector on said mounting means second side and out between said front edges of said plate members, but not so far back as to impede significantly installation of cross-connect jumper fibers in connector means on said mounting means.

2. The lightguide fiber distributing unit in accordance with claim 1 in which there are provided a plurality of said at least one shelf portion, and at least one fiber cable channel for multifiber cables extending vertically along a rear portion of said plurality of shelf portions and including said covering means having said opening for passing a cable between an interior portion of said channel and said region between said upper and lower plate members of said at least one shelf portion.

3. The lightguide fiber distributing unit in accordance with claim 2 in which there are provided means for at least partially covering at least one of said channel openings to reduce the likelihood of a cable which is being passed through said channel entering an opening at an incorrect shelf portion.

4. The lightguide fiber distributing unit in accordance with claim 2 in which there are provided flexible retaining rings for lightguide fibers secured to a face of said cable channel which is adjacent to said at least one shelf portion and secured adjacent to said opening for said at least one shelf portion, said retaining rings being spaced sufficiently to support a fiber loop of greater than a predetermined minimum bending radius for substantially no stress and no signal bend loss in such fibers and parallel to said face of said channel.

5. The lightguide fiber distributing unit in accordance with claim 2 in which said plurality of shelf portions are vertically spaced from one another at portions thereof adjacent to said front edges to form between each pair of adjacent shelf portions a horizontal cross-connect jumper fiber channel extending transversely across a region of each shelf portion adjacent to the front edge thereof, and split retaining pins mounted each one-half on each adjacent shelf portion so defining a horizontal channel and located along the front edge of the respective shelf portions for cooperating to retain fibers in said horizontal channel which have theretofore been inserted through splits in respective pins.

6. The lightguide fiber distributing unit in accordance with claim 5 in which one of said plate members of each shelf portion includes a rearwardly extending portion shaped to extend behind said horizontal jumper channel region for enlarging a rear region of said shelf portion adjacent to said cable channel.

7. The lightguide fiber distributing unit in accordance with claim 1 in which said mounting means of a shelf portion comprises at least one connector panel, and said securing means includes means for attaching said at least one connector panel to said upper and lower plate members.

8. The lightguide fiber distributing unit in accordance with claim 7 in which said attaching means comprises aligned apertures in said at least one panel and said securing means, and plural manually insertable and latchable members extending through sets of said aligned apertures for attaching said at least one panel to said panel securing means.

9. The lightguide fiber distributing unit in accordance with claim 7 in which there are provided at least one fiber cable channel for multifiber cables extending vertically along a rear portion of said at least one shelf portion and including said covering means having said opening for passing a cable between an interior portion of said channel and said region between said upper and lower plate members of said at least one shelf portion.

first and second side members for said at least one shelf portion said side members further enclosing said region together with said at least one connector panel, said upper and lower plate members, and said channel.

10. The lightguide fiber distributing unit in accordance with claim 1 in which a horizontally hinged closure is provided for said at least one shelf portion and means are provided for mounting hinge supports for said closure at the level of said lower plate member thereof but forwardly spaced from the front edge of said lower plate member by a sufficient distance to permit free passage of cross-connect jumpers around front edges of said shelf portion plate members when said closure is in its closed position.

* * * * *